(12) United States Patent
Murray et al.

(10) Patent No.: US 8,166,171 B2
(45) Date of Patent: Apr. 24, 2012

(54) PROVISION OF RESOURCE ALLOCATION INFORMATION

(75) Inventors: Paul Murray, Bristol (GB); Patrick Goldsack, Bristol (GB); Julio Ceasr Guijarro, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/045,216

(22) Filed: Mar. 10, 2011

(65) Prior Publication Data

US 2011/0167146 A1 Jul. 7, 2011

Related U.S. Application Data

(62) Division of application No. 11/081,248, filed on Mar. 16, 2005, now Pat. No. 7,949,753.

(30) Foreign Application Priority Data

Mar. 30, 2004 (GB) .................................. 0407117.1

(51) Int. Cl.
*G06F 15/173* (2006.01)
(52) U.S. Cl. ........ 709/226; 709/202; 709/223; 709/224; 718/107; 718/108
(58) Field of Classification Search .................. 709/202, 709/226, 223–224; 718/107, 108
See application file for complete search history.

(56) References Cited

U.S. PATENT DOCUMENTS

| | | | |
|---|---|---|---|
| 5,748,892 A | 5/1998 | Richardson | |
| 5,781,737 A * | 7/1998 | Schmidt | 709/224 |
| 5,819,019 A | 10/1998 | Nelson | |
| 6,128,657 A | 10/2000 | Okanoya et al. | |
| 6,154,787 A | 11/2000 | Urevig et al. | |
| 6,330,586 B1 | 12/2001 | Yates et al. | |
| 6,360,263 B1 | 3/2002 | Kurtzberg et al. | |
| 6,523,065 B1 | 2/2003 | Combs et al. | |
| 6,766,348 B1 | 7/2004 | Combs et al. | |
| 6,768,718 B1 | 7/2004 | Beshai et al. | |
| 6,799,172 B2 * | 9/2004 | Candee et al. | 1/1 |
| 6,901,446 B2 | 5/2005 | Chellis et al. | |
| 6,970,925 B1 * | 11/2005 | Springmeyer et al. | 709/224 |
| 7,150,020 B2 | 12/2006 | Kalhour | |
| 7,194,538 B1 | 3/2007 | Rabe et al. | |
| 7,260,079 B1 | 8/2007 | Chapman et al. | |
| 7,308,687 B2 | 12/2007 | Trossman et al. | |
| 7,403,988 B1 | 7/2008 | Blouin et al. | |

(Continued)

OTHER PUBLICATIONS

Node definition from PC Magazine Encyclopedia, from <http://www.pcmag.com/encyclopedia_term/0,2542,t=node&i=48028,00.asp> printed Mar. 10, 2011.

*Primary Examiner* — Alina N. Boutah

(57) ABSTRACT

A system is provided for disseminating resource allocation information from system resources to state-information observers comprising resource users and typically also at least one system resource manager. Each resource maintains state information about its identity and its allocation to one or more resource users. Each resource provides this information to a state-dissemination arrangement which disseminates it to each state-information observer. Each resource user uses the state information it receives from the state-dissemination arrangement to ascertain the resources allocated to it. Similarly, a system resource manager, when present, uses the state information it receives from the state-dissemination arrangement to ascertain the allocation of those resources that are of interest to the manager. A resource, resource user and resource manager for use in such a system are also provided.

20 Claims, 7 Drawing Sheets

U.S. PATENT DOCUMENTS

| | | |
|---|---|---|
| 7,447,257 B2 | 11/2008 | Lee |
| 7,555,543 B2 | 6/2009 | Encarnacion et al. |
| 7,567,516 B2 | 7/2009 | Beshai et al. |
| 7,570,952 B2 | 8/2009 | Woxberg et al. |
| 7,596,790 B2 | 9/2009 | Moakley |
| 2002/0013802 A1 | 1/2002 | Mori et al. |
| 2002/0186711 A1 | 12/2002 | Masuyama et al. |
| 2003/0061334 A1* | 3/2003 | Hirata et al. ............... 709/223 |
| 2003/0061361 A1 | 3/2003 | Bacik et al. |
| 2003/0069828 A1 | 4/2003 | Blazey et al. |
| 2003/0069972 A1 | 4/2003 | Yoshimura et al. |
| 2003/0079031 A1 | 4/2003 | Nagano |
| 2003/0177230 A1* | 9/2003 | Stalker ............... 709/224 |
| 2003/0233446 A1 | 12/2003 | Earl |
| 2004/0010582 A1 | 1/2004 | Oliver |
| 2004/0029591 A1 | 2/2004 | Chapman et al. |
| 2004/0039816 A1 | 2/2004 | Bae et al. |
| 2004/0205239 A1 | 10/2004 | Doshi et al. |
| 2004/0215780 A1 | 10/2004 | Kawato |
| 2004/0267395 A1 | 12/2004 | Discenzo et al. |
| 2005/0010667 A1 | 1/2005 | Moriki et al. |
| 2005/0015621 A1 | 1/2005 | Ashley et al. |
| 2005/0050545 A1 | 3/2005 | Moakley |
| 2005/0135330 A1 | 6/2005 | Smith et al. |
| 2005/0210152 A1 | 9/2005 | Hawes |
| 2006/0198324 A1 | 9/2006 | Nerses et al. |
| 2006/0217123 A1 | 9/2006 | Ishii et al. |
| 2008/0086731 A1 | 4/2008 | Trossman et al. |

* cited by examiner

LOCAL PROVIDER TABLE

| Identifier | Local Providers List | Listener SD Servers |
|---|---|---|
| S1 | 40A | 50A, 50C |
| S2 | 40B | 50B, 50C |
| | | |

LOCAL LISTENER TABLE

| Indicator | Local Listeners List | Provider SD Servers |
|---|---|---|
| S1 | 41B | 50A |
| S3 | 41A | 50C |
| | | |

LOCAL REGISTER FOR SD SERVER 50A

Figure 4

PROVISION OF RESOURCE ALLOCATION INFORMATION

CROSS-REFERENCE TO RELATED APPLICATION

This application is a divisional of U.S. patent application Ser. No. 11/081,248, which was filed on May 16, 2005.

FIELD OF THE INVENTION

The present invention relates to the provision of resource allocation information to entities of a processing system, and to a resource entity, resource user entity and resource manager entity for use in such a system.

BACKGROUND OF THE INVENTION

Computer systems can be viewed as containing resource entities of various types that are used by resource user entities to provide a particular service. Typical resource entities (or simply 'resources') include entities for running programs, storing data, providing communication, or performing some other function, such as encryption/decryption. A resource user entity (or more simply 'resource user') can, for example, be constituted by an application program providing a particular service.

Typically, multiple resource users will exist concurrently in a computer system with the current population of resource users changing over time according to the needs of human end users; this is particularly the case if the computer system is a very large facility such as a data center. Also, from time to time a resource will fail to operate correctly and need to be replaced; conversely, a resource user may fail, effectively freeing up the resources it was using. For the foregoing reasons, the allocation of resources to resource users needs to change over time and this must be managed appropriately. In particular, resources must be allocated in way which ensures that each resource user is aware of the resources that have been allocated to it and can use them, and that the system does not lose track when failures occur. The role of managing resource allocation is carried by one or more resource managers; of course, where multiple resource managers are used, the problem of coordinating resource allocation becomes even harder.

Past attempts to solve this problem have typically relied on an inventory or a similar representation to maintain information about the resources and their allocation.

It is an object of the present invention to provide a way of managing resource allocation that facilitates the provision of allocation information to entities that require to know such information.

SUMMARY OF THE INVENTION

According to a first aspect of the present invention, there is provided a system comprising:
- a plurality of resources each arranged to maintain and provide state information about its allocation to one or more resource users and its identity;
- a state-dissemination arrangement for disseminating the state information provided by the resources; and
- at least one receiving entity arranged to receive state information from the state-dissemination arrangement, said at least one receiving entity comprising at least one resource user arranged to use the state information it receives to ascertain which of the resources, if any, have been allocated to it.

Typically, the said at least one receiving entity further comprises at least one resource manager arranged to receive state information from the state-dissemination arrangement whereby to ascertain the allocation of the resources of interest to the manager.

The state-dissemination arrangement can be arranged to deliver the state information provided by all the resources to every one of the receiving entities. Preferably, however, the or each receiving entity is arranged to register with the state-dissemination arrangement to indicate its interest in particular state information, and the state-dissemination arrangement is arranged to use these registered interests to manage the dissemination of state information.

In one preferred embodiment, the state-dissemination arrangement includes communication timing means for monitoring the communication time taken to disseminate information from a resource to the or each receiving entity that wishes to receive state information from it, the communication timing means being arranged to cause the or each such receiving entity to be informed, upon the monitored communication time for disseminating information to it from the resource concerned exceeding a predetermined time value, that state information for the resource is no longer available. In this case, each receiving entity can assume that any resource and resource allocation it observes is correct to within the aforesaid predetermined time limit. A resource manager can assume that any resource allocation it observes is either observed, or its absence is observed, by all interested resource users and other resource managers, if any, within the predetermined time limit. This level of consistency allows a resource manager to know allocations do not conflict.

Advantageously, the state-dissemination arrangement further includes partition means for identifying non-overlapping collections where each collection comprises at least one resource and at least one receiving entity between all of which state information can be disseminated within said predetermined time limit as monitored by the communication timing means; the at least one receiving entity of a collection being arranged to take account of state information only from resources within the same collection; and the state-dissemination arrangement being further arranged to inform the receiving entities of a collection of any disruption to collection membership whereby each such receiving entity knows that it cannot rely upon the receipt, by interested receiving entities of the collection, of any item of state information which the receiving entity itself has received within an immediately preceding time period of duration corresponding to twice said predetermined time limit. In this case, each receiving entity in a collection can assume that any resource and resource allocation it observes is also observed by all other interested receiving entities in the same collection within the aforesaid predetermined time limit and is not observed by any receiving entity outside its collection. This level of consistency allows multiple resource managers in a collection to take coordinated actions without requiring additional direct communication. In addition resource managers that are partitioned from each other can coordinate with each other in respect of certain actions involved in a partition change. In terms of its constituent entities, a preferred embodiment of a system according to the present invention comprises:
- a resource entity arranged to maintain state information about its allocation to one or more resource users and its identity, and to provide this information, at least upon a change of allocation of the resource entity, to the state dissemination arrangement whereby to enable resource user entities to ascertain whether they have been allocated the resource entity;

a resource user entity arranged to receive from the state dissemination arrangement state information that has been provided by at least one resource entity and comprises information about the allocation of the resource entity to one or more resource users and the identity of the resource entity, the resource user entity being arranged to use the received state information to ascertain which resources have been allocated to it; and a resource manager entity arranged to receive from the state dissemination arrangement state information that has been provided by at least one resource entity and comprises information about the allocation of the resource entity to one or more resource users and the identity of the resource entity, the resource manager entity being arranged to use the received state information to ascertain the allocation of resources of interest to it; and the resource manager being further arranged to output allocation messages to set the allocation of the or each resource entity of interest to it.

Each of these entities individually embodies aspects of the present invention.

BRIEF DESCRIPTION OF THE DRAWINGS

Embodiments of the invention will now be described, by way of non-limiting example, with reference to the accompanying diagrammatic drawings, in which:

FIG. 4 is a diagram illustrating local register tables maintained by a state manager of the FIG. 3 state-dissemination server;

BEST MODE OF CARRYING OUT THE INVENTION

Figure 1:
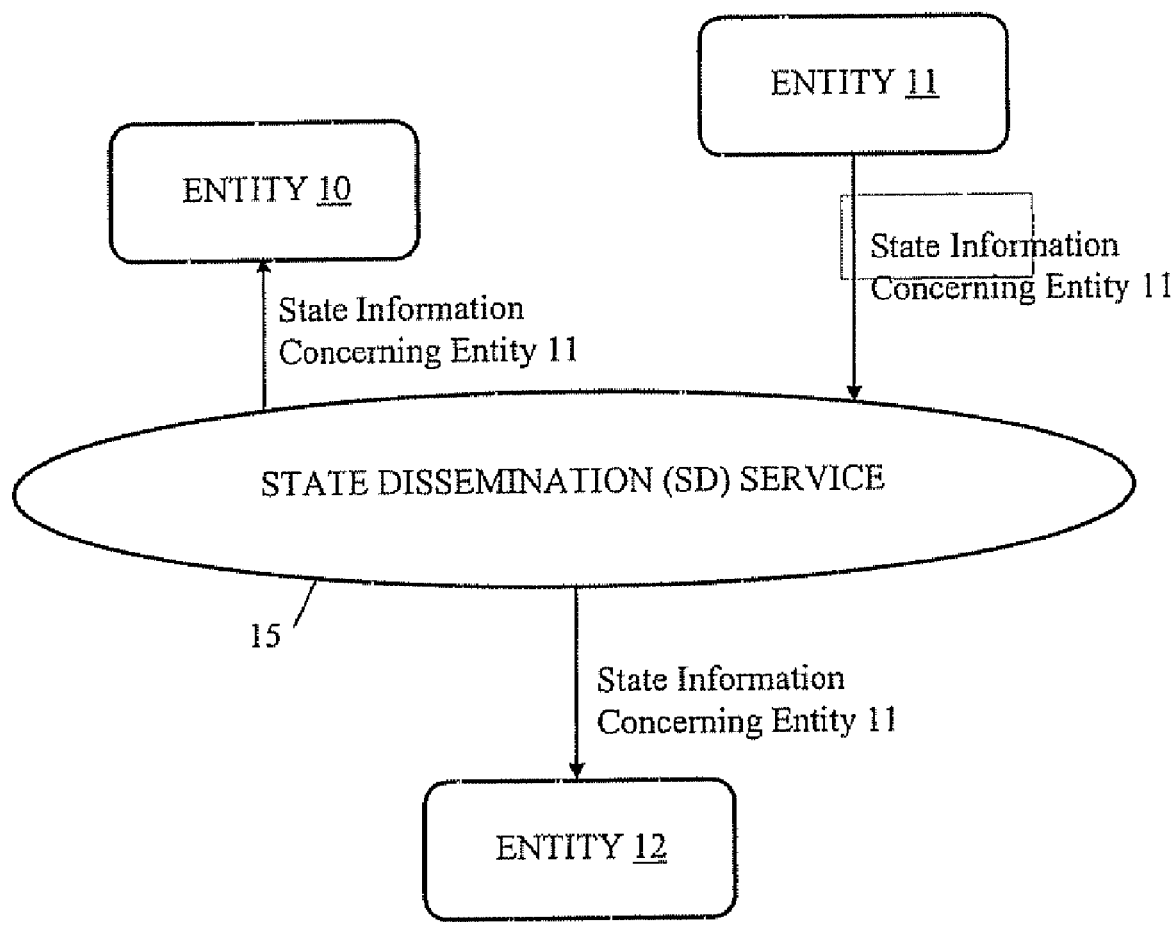
FIG. 1 is a diagram illustrating the general operation of a state-dissemination service employed in embodiments of the invention.

The embodiments of the invention to be described hereinafter are based on the dissemination of state information about an entity of a system from that entity to other entities of the system. FIG. 1 depicts the general operation of such a state-dissemination service. More particularly, FIG. 1 shows three entities 10, 11, and 12 each of which has access to a state-dissemination service 15. The entity 11 has state information that it is willing to share with other entities 10, 12; accordingly, the entity 11 provides its state information to the state-dissemination service 15, this typically being done each time the information changes in any way. The state-dissemination service 15 is then responsible for providing the state information concerning entity 11 to the entities 10 and 12.

The state-dissemination service 15 can be arranged simply to supply the state information it receives from any entity to every other entity; however, preferably, each entity that wishes to receive state information registers a state-information indicator with the state-dissemination service 15 to indicate the particular state information in which it is interested in receiving. This indicator could, for example, simply indicate that the registering entity wants to receive all state information provided by one or more specified other entities; alternatively, the indicator could indicate the identity of the particular state information that the registering entity wants to receive regardless of the entity providing it. In this latter case, when state information is provided by an entity to the state-dissemination service 15, the providing entity supplies a state-information identifier which the service 15 seeks to match with the indicators previously registered with it; the provided state information is then passed by the state-dissemination service to the entities which have registered indicators that match the identifier of the provided state information.

Rather than this matching being effected by the state-dissemination service 15 at the time the state information is provided to it, entities that intend to provide state information to the service 15 are preferably arranged to register in advance with the service to specify state-information identifier(s) for the state information the registering entity intends to provide; the state-dissemination service 15 then seeks to match the registered identifiers with the registered indicators and stores association data that reflects any matches found. The association data can directly indicate, for each registered identifier, the entities (if any) that have registered to receive that information; alternatively, the association data can be less specific and simply indicate a more general pattern of dissemination required for the state information concerned (for example, where the entities are distributed between processing nodes, the association data can simply indicate the nodes to which the state information should be passed, it then being up to each node to internally distribute the information to the entities wishing to receive it). The association data is updated both when a new identifier is registered and when a new indicator is registered (in this latter case, a match is sought between the new indicator and the registered identifiers).

When an entity subsequently provides state information identified by a state-information identifier to the state-dissemination service, the latter uses the association data to facilitate the dissemination of the state information to the entities that have previously requested it by registering corresponding state-information indicators.

As will be more fully described below, where the entities are distributed between processing nodes, the state-dissemination service is preferably provided by an arrangement comprising a respective state-dissemination server entity at each node. In addition, where the state-dissemination service operates by generating association data from supplied state-information identifiers and indicators, preferably not only are the state-information identifiers and indicators associated with the entities at each node recorded in registration data held by that node, but the association data concerning the state-information identifiers registered by the node entities of that node is also stored at the node. Furthermore, each node preferably stores source data indicating, for each state-information indicator registered by the entities of that node, the origin of the corresponding state information. As will be explained hereinafter, by arranging for this local storage of registration data, association data and source data, a relatively robust and scalable state-dissemination service can be provided.

Figure 2:
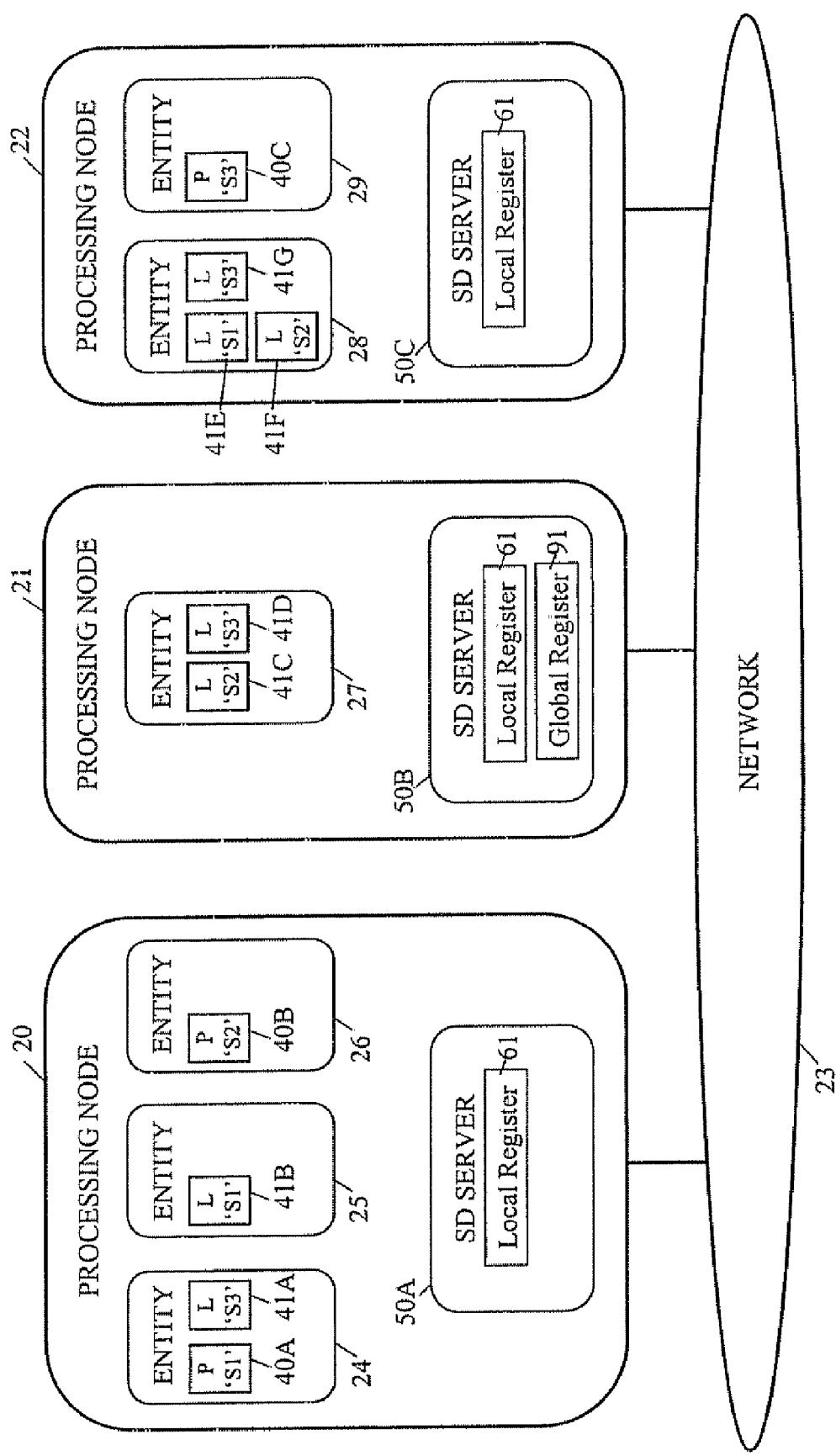
FIG. 2 is a diagram of a distributed system with multiple processing nodes each including a state-dissemination server.

FIG. 2 shows an example distributed system with multiple processing nodes 20, 21 and 22 arranged to intercommunicate via any suitable communication arrangement here shown as a network 23. Node 20 includes entities 24, 25 and 26, whilst node 21 includes entity 27 and node 22 includes entities 28 and 29.

The FIG. 2 system operates a state-dissemination service provided by a state-dissemination arrangement comprising a respective state-dissemination (SD) server 50A, 50B and 50C at each node 20, 21 and 22; the SD servers are arranged to communicate with each other via the network 23.

Each one of the entities 24 to 29 that intends to provide state information to the state-dissemination service is arranged to register a corresponding state-information identifier with the local SD server 50 (that is, with the SD server at the same node). To this end, each such entity instantiates a software "state provider" object P (generically referenced 40) and passes it the identifier of the state information to be provided to the state-dissemination service. The state provider object 40 is operative to the register itself and the state-information identifier with the local SD server 50 and the latter stores this registration data in a local register 61; the state provider object 40 is also operative to subsequently provide instances of the identified state information to the SD server.

Similarly, each one of the entities 24 to 29 that wishes to receive particular state information from the state-dissemination service is arranged to register a corresponding state-information indicator with the local SD server 50 (that is, with the SD server at the same node). To this end, each such entity instantiates a software "state listener" object L (generically referenced 41) and passes it the indicator of the state information to be provided by the state-dissemination service. The state listener object 41 is operative to register itself and the state-information indicator with the local SD server 50 and the latter stores this registration data in the local register 61; the state listener object 41 is also operative to subsequently receive the indicated state information from the SD server.

It will be appreciated that the use of software state provider and listener objects 40 and 41 to interface the entities 24 to 29 with their respective SD servers 50 is simply one possible way of doing this.

In the present example, regarding the provision of state information:

Entity 24 of node 20 is arranged to provide state information identified by state-information identifier 'S1' to which end the entity instantiates state provider 40A which registers itself and the identifier 51 with SD server 50A;

Entity 26 of node 20 is arranged to provide state information identified by state-information identifier 'S2' to which end the entity instantiates state provider 40B which registers itself and the identifier S2 with SD server 50B; and Entity 29 of node 22 is arranged to provide state information identified by state-information identifier 'S3' to which end the entity instantiates state provider 40C which registers itself and the identifier S3 with SD server 50C;

Regarding the receipt of state information:

Entity 24 of node 20 is interested in receiving state information indicated by state-information indicator 'S3' to which end the entity instantiates state listener 41A which registers itself and the indicator S3 with SD server 50A;

Entity 25 of node 20 is interested in receiving state information indicated by state-information indicator 'S1' to which end the entity instantiates state listener 41B which registers itself and the indicator 51 with SD server 50A;

Entity 27 of node 21 is interested in receiving state information indicated by either one of state-information indicators 'S2' and S3', to which end the entity instantiates corresponding state listeners 41C and D each of which registers itself and the indicator S2 and S3 respectively with SD server 50B; and Entity 28 of node 22 is interested in receiving state information indicated by any one of state-information indicators 'S1', 'S2' and S3', to which end the entity instantiates corresponding state listeners 41E, F, and G each of which registers itself and the indicator S1, S2 and S3 respectively with SD server 50C.

The data registered by the or each state provider and/or listener associated with a particular node constitutes registration data and is held by the SD server of that node.

In this example, it can be seen that the same state-information labels S1, S2, and S3 have been used for the state-information identifiers and indicators; in this case, the matching of identifiers and indicators carried out by the state-dissemination service simply involves looking for a full match between an identifier and indicator. However, using exactly the same identifiers and indicators is not essential and matching based on parts only of an identifier and/or indicator is alternatively possible (for example, the state-dissemination service can be arranged to determine that a state-information indicator 'abcd' is a match for a state-information identifier 'abcdef'). Furthermore, although not illustrated in the FIG. 2 example, an entity can be arranged to provide the same state information under several different identifiers; in the present case, this involves instantiating a respective state provider for each identifier. In addition, as well as more than one state listener registering the same state-information indicator as illustrated in FIG. 2, more than one state provider can register the same state-information identifier.

Figure 5:
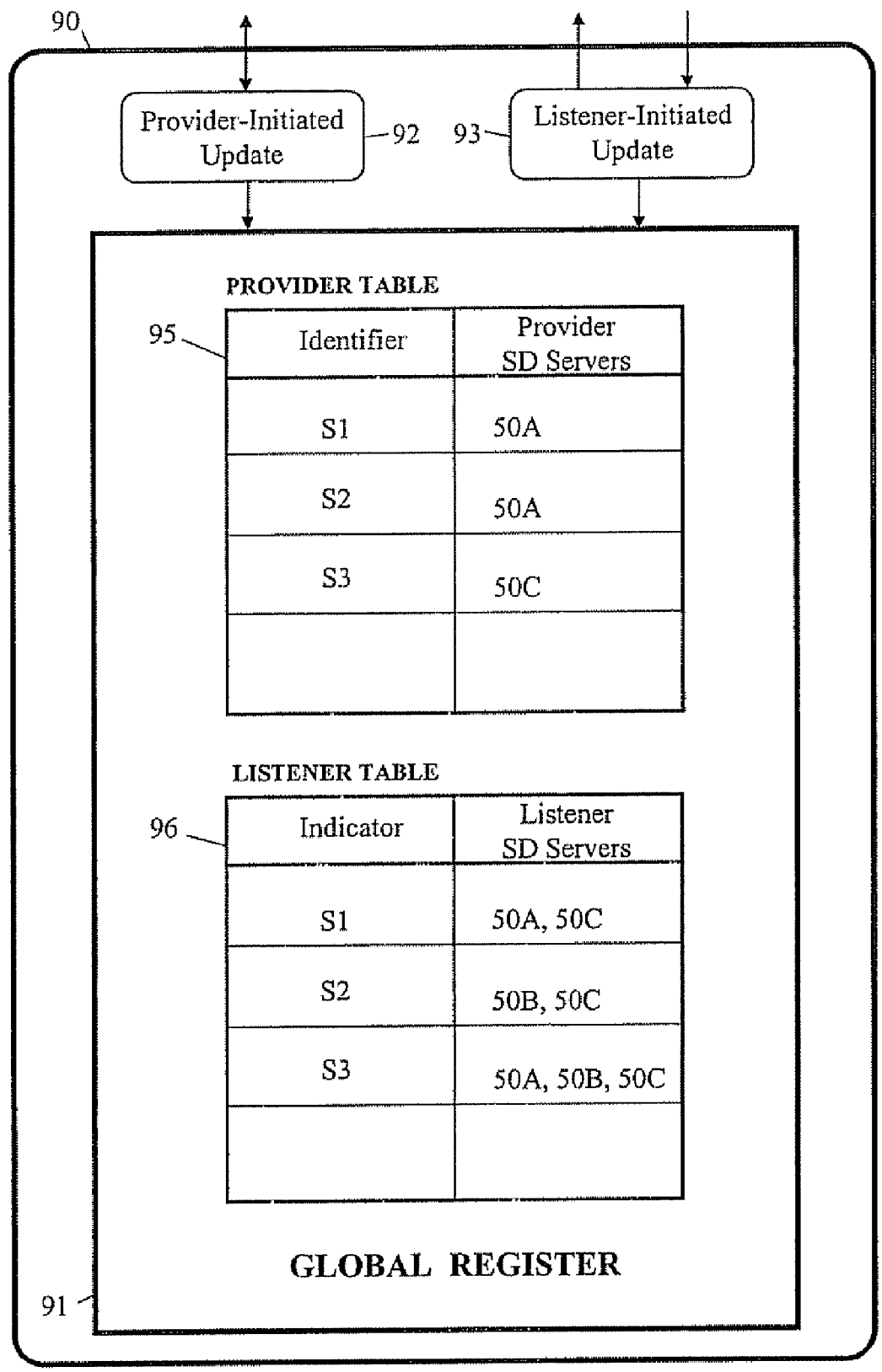
FIG. 5 is a diagram illustrating global register tables maintained by a state manager of one of the state-dissemination servers of the FIG. 2 system.

The state-dissemination service provided by the SD servers 50A-C is arranged to derive association data and source data from the registered state-information identifiers and indicators. In the present case, the association data is used to indicate, for each state-information identifier, the SD server (s) where corresponding indicators have been registered; the source data is used to indicate, for each state-information indicator, the SD server(s) where corresponding identifiers have been registered (of course, the source data can also be considered to be a form of association data, however, the term 'source data' is used herein to distinguish this data from the above-mentioned data already labelled with the term 'association data'). For each identifier, the corresponding association data is held by the SD server where the identifier is registered; similarly, for each indicator, the corresponding source data is held by the SD server where the indicator is registered. As will be more fully explained below with reference to FIGS. 3 to 5, the association data and source data are determined in the present example by making use of a global register 91, maintained by one of the SD servers, that records the SD server(s) where each identifier and indicator has been registered. The global register 91 is only used for compiling the association data and source data and its loss is not critical to the dissemination of state information in respect of previously registered state-information identifiers and indicators already taken account of in the association data held by operative SD servers; furthermore, the contents of the global register can be reconstituted from the registration data held by the operative SD servers.

Figure 3:
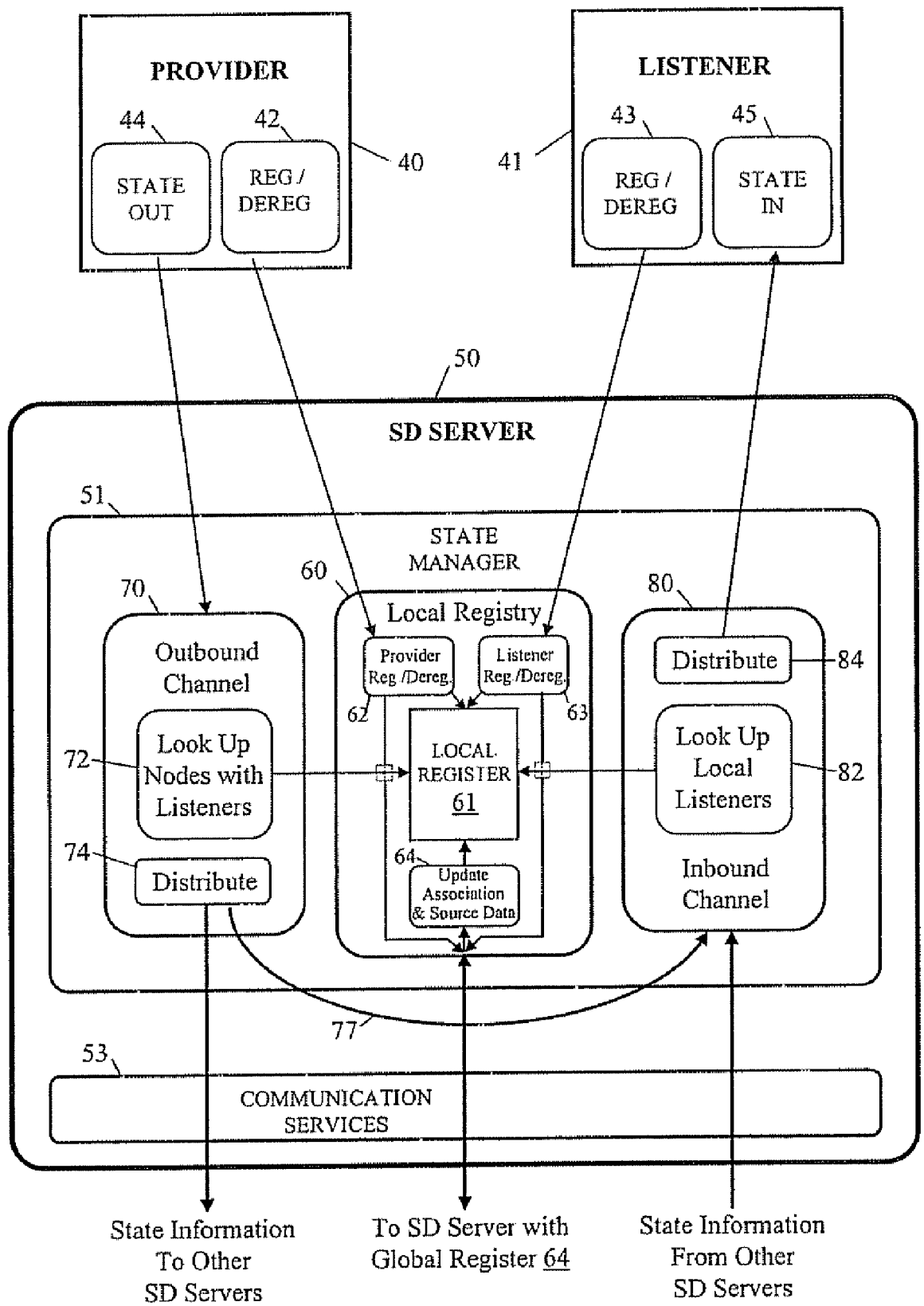
FIG. 3 is a diagram of a first form of state-dissemination server usable in the FIG. 2 system.

FIG. 3 shows in more detail one implementation of the SD servers 50 of the FIG. 2 system. The SD server 50 shown in FIG. 3 comprises a state manager functional block 51 and a communications services functional block 53, the latter providing communication services (such as UDP and TCP) to the former to enable the state manager 51 to communicate with peer state managers of other SD servers.

The state manager 51 comprises a local registry 60, an outbound channel for receiving state information from a local state provider 40 and passing this information on to other SD servers 50 as required, and an inbound channel 80 for distributing state information received from other SD servers 50 to interested local listeners 41. The state manager of one of the SD servers also includes a global registry; all SD servers have the capability of instantiating the global register and the servers agree amongst themselves by any appropriate mechanism which server is to provide the global registry. The registry is not shown in the state manager 51 of FIG. 3 but is separately illustrated in FIG. 5

The local registry 60 comprises the local register 61 for holding the registration data concerning the local entities as represented by the local providers 40 and listeners 41, the association data for the state-information identifiers registered by the local providers 40, and source data for the state-information indicators registered by the local listeners 41. As depicted in FIG. 4, the local register 61 is actually organised as two tables, namely a local provider table 95 and a local listener table 66.

In the local provider table 65, for each identifier registered by a local provider 40, there is both a list of the or each local provider registering that identifier, and a list of every SD server, if any, where a matching state-information indicator has been registered. Table 65 thus holds the registration data for the local providers 40 and their associated identifiers, along with the association data concerning those identifiers.

In the local listener table 66, for each indicator registered by a local listener 41, there is both a list of the or each local listener registering that indicator, and a list of every SD server, if any, where a matching state-information identifier has been registered. Table 66 thus holds the registration data for the local listeners 41 and their associated indicators, along with the source data concerning those indicators.

With respect to the global registry 90 (FIG. 5), this comprises a global register 91 holding both a provider table 95 and a listener table 96. The provider table 95 lists the state-information identifiers that have been notified to it and, for each identifier, the or each SD server where the identifier is registered. The listener table 96 lists state-information indicators that been have notified to it and, for each indicator, the or each SD server where the indicator is registered.

When a local provider 40 is first instantiated, a registration/deregistration functional element 42 of the provider 40 notifies the local registry 60 and the registration process proceeds as follows:

(a) A functional element 62 of the registry 60 checks if the state-information identifier associated with the new provider is present in provider table 65—if not, a new entry is added. The functional element 62 then adds the identity of the new provider to the entry for the associated identifier in the provider table 65.
(b) If a new entry had to be created in table 65 for the identifier associated with the new provider, then the following operations are effected:
  (i) The functional element 62 sends an identifier registration message including the registration details to the global registry 90 by using the communication services provided by block 53.
  (ii) A functional element 92 of the global registry 90 effects the following operations upon receipt of the identifier registration message at the global registry:
    A check is first made as to whether the identifier concerned is already present in the provider table 95 and, if so, the identity of the SD server from which the identifier registration message was sent is added to the list of servers associated with the existing entry for the identifier; if there is no existing entry for the identifier in table 95, a new entry is created and the identity of the SD server from which the just-received message was sent is made the first entry in the list of servers associated with the new entry.
    Matches are sought between the identifier in the identifier registration message and the state-information indicators in the listener table 96. A list of the SD servers associated with any matches found (the 'listener SD servers') is then returned in an association-data update message to the local registry 60 which sent the identifier registration message.
  (iii) The SD-server list returned in the association-data update message to the local registry 60 of the SD server that originated the identifier registration message, is received by a functional element 64 which then updates the association data held in the local provider table 65 of register 61 in respect of the identifier concerned, by adding the listener SD servers in the association-data update message to the list of listener SD servers for that identifier.

In a similar manner, when a local listener 41 is first instantiated, a registration/deregistration functional element 43 of the listener 41 notifies the local registry 60 and the registration process proceeds as follows:

(a) A functional element 63 of the registry 60 checks if the state-information indicator associated with the new listener is present in listener table 66—if not, a new entry is added. The functional element 63 then adds the identity of the new listener to the entry for the associated indicator in the listener table 66.
(b) If a new entry had to be created in table 65 for the identifier associated with the new provider, then the following operations are effected:
  (i) The functional element 63 sends an indicator registration message including the registration details to the global registry 90 by using the communication services provided by block 53.
  (ii) A functional element 93 of the global registry effects the following operations upon receipt of the identifier registration message at the global registry:
    A check is first made as to whether the indicator concerned is already present in the listener table 96 and, if so, the identity of the SD server from which the indicator registration message was sent is added to the list of servers associated with the existing entry for the indicator; if there is no existing entry for the indicator in table 96, a new entry is created and the identity of the SD server from which the just-received message was sent is made the first entry in the list of servers associated with the new entry.
    Matches are sought between the indicator in the indicator registration message and the state-information identifiers in the provider table 95. Each of the SD servers associated with any matches found (the 'provider SD servers') is then sent an association-data update message including the identity of the SD server that originated the registration message and the relevant identifier(s) found to match the newly registered indicator.
  (iii) At each SD server that receives an association-data update message, the functional element 64 updates the association-data held in the local provider table 65 of register 61 by adding the SD server included in the association-data update message to the list of listener SD servers for the or each identifier referenced in the message.

With regard to the updating of the source data held in the local listener table 66 of each SD server 66 in response to the registration of a new provider 40 or listener 41, this is effected by the inbound channel 80 of each SD server when it receives state information in respect of an identifier that the registry 60 finds is a match for one or more state-information indicators in the table 66 (the handling of newly-received state information by the state manager 60 is described more fully below)

Rather than a newly registered listener having to wait for a change in state information for which it has registered before receiving that state information, provision can be made for providers of this information to send the current version of the state information of interest to the listener concerned (either by a dedicated exchange of messages or by the provider(s) being triggered to re-send their information via the state-dissemination arrangement).

The deregistration of a provider 40 or listener 41 is effectively the reverse of registration and involves the same functional elements as for registration. The main difference to note is that an identifier/indicator deregistration message is only sent from the local registry 60 to the global registry 90 if a state-information identifier or indicator is removed from the local provider table 65 or local listener table 66 (which is done when there ceases to be any associated provider or listener respectively).

In normal operation, upon an entity detecting a change in state information for which it has a provider 40 registered with its local register 60, a functional element 44 of the provider notifies the outbound channel 70 of the local register that there is new state information in respect of the state-information identifier concerned. A functional element 72 of the outbound channel 70 then looks up in the local provider table 65 of the register 60, the association data for the identifier in order to ascertain the SD servers to which the new state information needs to be sent; the new state information is then distributed, together with its identifier, to these servers by functional element 74. This distribution will typically involve use of the communication services provided by block 53; however, where a local listener 41 (that is, one at the same node) has registered to receive the state information, then the functional element 74 simply passes it to the inbound channel 80 of the same server (see arrow 77 in FIG. 3).

When an SD server 50 receives new state information, identified by a state-information identifier, from another SD server, it passes the information to the inbound channel 80 of the state manager 51. Upon new state information being received at the inbound channel 80 (whether from another SD server or from the local outbound channel), a functional element 82 of the inbound channel uses the identifier associated with the new state information to look up in the local listeners table 66 the listeners that have registered state-information indicators that match the identifier. The functional element 82 also checks that the SD server that sent the state information is in the list of provider SD servers for each matched indicator, if this is not the case, the list is updated (thereby updating the source data for the indicator concerned). A functional element 84 of the inbound channel is then used to distribute the received state information to the matched listeners 41 where it is received by respective functional elements 45 of the listeners.

As so far described, the state-dissemination arrangement of the FIG. 2 system provides a basic state-dissemination service (in fact, for this basic service, the source data and the functional elements that handle and use it are not required).

This basic state-dissemination service only permits certain limited assumptions to be made by entities using the service; thus, an entity that has registered to receive particular state information can only assume that any version of this information that it observes has existed at some stage, but cannot assume that other entities registered to receive the information have also observed the same information.

Figure 6:
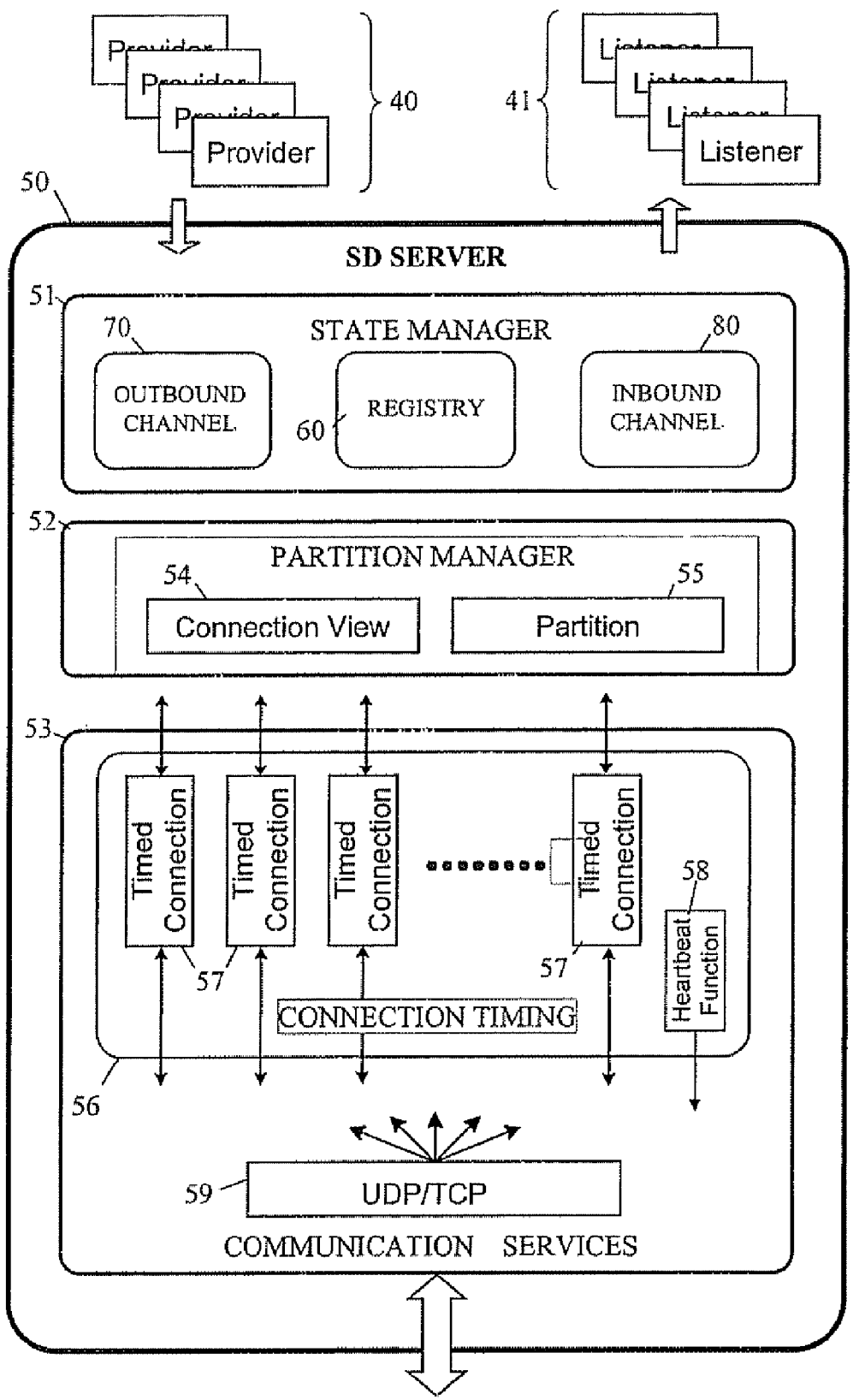
FIG. 6 is a diagram illustrating enhancements to the form of state-dissemination server shown in FIG. 3.

As will be described below with reference to FIG. 6, the basic state-dissemination arrangement is preferably enhanced to provide better consistency properties for the state information it disseminates. More particularly, two enhanced forms of state-dissemination arrangement are described:

in the first enhanced form (herein referred to as the "TSD" arrangement) connection-timing functionality 56 is added to the communications services functional block 53 of each SD server 50 to provide the overall arrangement with the properties of a fail-aware timed asynchronous system, and in the second enhanced form (herein referred to as the "TPSD" arrangement) in addition to the connection-timing functionality, a partition manager 52 is inserted between the state manager 51 and the communications services block 53 of each SD server to divide the state-dissemination arrangement into partitions. A partition is a collection of entities in a system that can all pass state information to one another within a given time limit. If two entities cannot pass state information between one another within the time limit they cannot be in the same partition. All entities exist in exactly one partition.

It may be noted that, for present purposes, any internal time delays in a node in passing state information received by an SD server to a listener or in notifying it that the information is no longer available, can be discounted. The communication timings between SD servers are therefore taken as being representative of the communication timings between entities (more specifically, between providers and matched listeners).

Considering first the TSD arrangement, the connection-timing functionality 56 added to the communications services block 53 comprises a respective timed-connection functional element 57 for checking the timing of communication between every other SD server and the subject SD server. This check involves checking that communication is possible between every other SD server and the subject server within a predetermined time value (for example, 3 seconds). To this end, every SD server is provided with a heartbeat message function 58 which broadcasts periodic messages, identifying the originating SD server, to every other server; this broadcast is, for example effected using the UDP service provided by the block 53. When an SD server receives such a heartbeat messages it passes it to the timed-connection functional element 57 associated with the server that originated the heartbeat message. This functional element 57 thereupon resets a timer that was timing out a period equal to the aforesaid predetermined time interval. Provided this timer is reset before time out, the connection with the corresponding server is considered to be timely. The interval between heartbeat messages is such that several such messages should be received by an associated timed-connection functional element 57 over a period equal to the predetermined time value so that it is possible for a heartbeat message to be missed without the corresponding timer timing out.

In the event that the timer of a timed-connection functional element 57 times out, the state manager 51 of the same SD server is notified that timely communication with the server associated with that functional element 57 has been lost. The state manager 51 then uses the source data held in the local register 61 to determine which of the local listeners 41 were registered to receive state information from the SD server with which timely communication has been lost; these listeners are then informed that state information is no longer available from this server.

The heartbeat messages broadcast by a SD server 50 also enables a new SD server to announce itself to the existing SD servers, the connection timing function 56 of each existing SD server being arranged to listen out for broadcast heartbeat messages from new SD servers and to instantiate a new timed-connection functional element 57 for each such server detected.

It will be appreciated that the above described way of checking communication timing is simply one example of how to carry out this task and many other ways are possible, for example, by the use of round trip timing or by time-stamping one-way messages using synchronized clocks at all SD servers.

The operational messages passed between the SD services (such as those used to distribute state information) are, in the present example, sent on a point to point basis using the TCP service provided by block 53. These messages are preferably also used for checking communication timing, temporarily substituting for the heartbeat messages.

The enhanced state-dissemination service provided by the TSD arrangement ensures that listeners only receives timely information. Furthermore, a state listener can assume that all other state listeners with an equivalent matching indicator will either see the same state information from a given provider within the aforesaid predetermined time limit or are notified that there is no such state information within the same time limit Considering next the TPSD arrangement, the partition manager 52 that is interposed between the communication services block 53 and the state manager 51 in each SD server, implements a partition membership protocol and a leader election protocol. Suitable implements of such protocols will be apparent to person skilled in the art so only a brief description is given here.

The partition manager 52 uses three conceptual views of the SD servers that are participating in the state-dissemination service, each view being determined locally. The first, the connection set, is the set of connections between the subject SD server and other SD servers identified by the communication services block 53. The second view, the connection view 54, is derived directly from the connection set and represents SD servers that are potential members of a partition including the subject SD server. All SD servers in the connection set are admissible to the connection view 54, except those that are untimely or have recently been untimely. All partition managers 52 communicate their connection views 54 to each other whenever these views change, so each SD server has a copy of the connection view derived by every node in its own connection view—the fact that these connections are timely guarantees that the exchanges of connection views are timely.

The collection of connection views 54 known to the partition manager 52, including its own view, are used to derive the partition including the subject SD server. A partition manager 54 is said to be stable when its collection of connection views remain unchanged and they all agree (i.e. they are all the same). When stable, the partition manager 54 sets the partition 55 to be the same as the local connection view. When unstable, the partition manager 54 reduces the partition by selectively evicting SD servers according to the changes. Each partition manager 54 derives its own partition, but the sharing of connection views and the function used to derive the partition provide the following properties:

1. If a partition manager is stable and its partition is P, then all partitions derived elsewhere are either subsets of P or do not intersect P.
2. If two partition managers are stable and their partitions are P and Q, then either P equals Q or P does not intersect Q.
3. If a partition manager is continuously stable between times $t-\Delta$ and t and its partition is P, then each node in P is stable at time $t-\Delta$ and has the same partition (here $\Delta$ is the aforesaid predetermined time limit).

The second property is actually derived from the first, if two partitions are subsets of each other then clearly they are the same, and so these two actually represent one property. The second property is stated to emphasise the point that the partition managers either converge on the same partition or distinctly different partitions—they do not overlap. As a result, by the time one partition manager stabilizes, all SD servers that are excluded from its partition know that they are excluded; or rather they derive their own partition that does not intersect it. The third property demonstrates that if the partition remains stable then all SD servers will figure this out.

The leader election protocol operates similarly to the partition protocol. As well as exchanging connection views 54 the partition managers 52 exchange leader candidates. Each manager re-evaluates its choice of leader when connection view changes occur in such a way that they all chose the same leader. Conveniently, the leader SD server provides the global registry 90.

By arranging for each SD server 50 only to send registration messages to the global registry 90 of the same partition 55, the state listeners 41 only see state information from state providers 40 that are in the same partition as them.

The enhanced state-dissemination service provided by the TPSD arrangement enables a state listener to assume that all other state listeners with equivalent matching indicators are either in the same partition and see all the same state information within the given predetermined time limit or they are not in the same partition and do not see any of the same state information within the same time limit.

Listeners are informed by the SD servers when the partition has become unstable. If a provider provides state information s at time t to the TPSD service, then provided the partition remains stable, all interested listeners will receive the information s by time $t+\Delta$. All such listeners can each then know by time $t+2\Delta$ that all other interested listeners have received the information s because it will be aware by this time of any disruption of the partition that would have prevented another interested listener from receiving the information by the time $t+\Delta$.

Put another way, whenever an entity is informed by its local SD server that the partition of which it is a member is no longer stable, such an entity knows that it cannot rely upon the receipt by interested entities of the partition, of any item of lifecycle-state information which the entity itself has received within an immediately preceding time period of duration corresponding to $2\Delta$.

It may be noted that the TPSD service has the effect of partitioning the totality of state information knowledge. When the partitions are stable, two entities either have access to the same knowledge partition or non-overlapping knowledge partitions. So, whatever state information the entities are interested in knowing, even if these are completely different items of state information, will be consistent. Thus, if a first entity knows state information by time $t+\Delta$, then at time $t+2\Delta$ this entity knows that whatever state information a second entity knew by time t-Δ, is consistent with information s, whether it be the information s or something else all together.

The basic and enhanced state-dissemination arrangements described above, including all the variants mentioned, are well suited for use in disseminating resource allocation information between entities of a system including resources, resource users and one or more resource managers.

Figure 7:
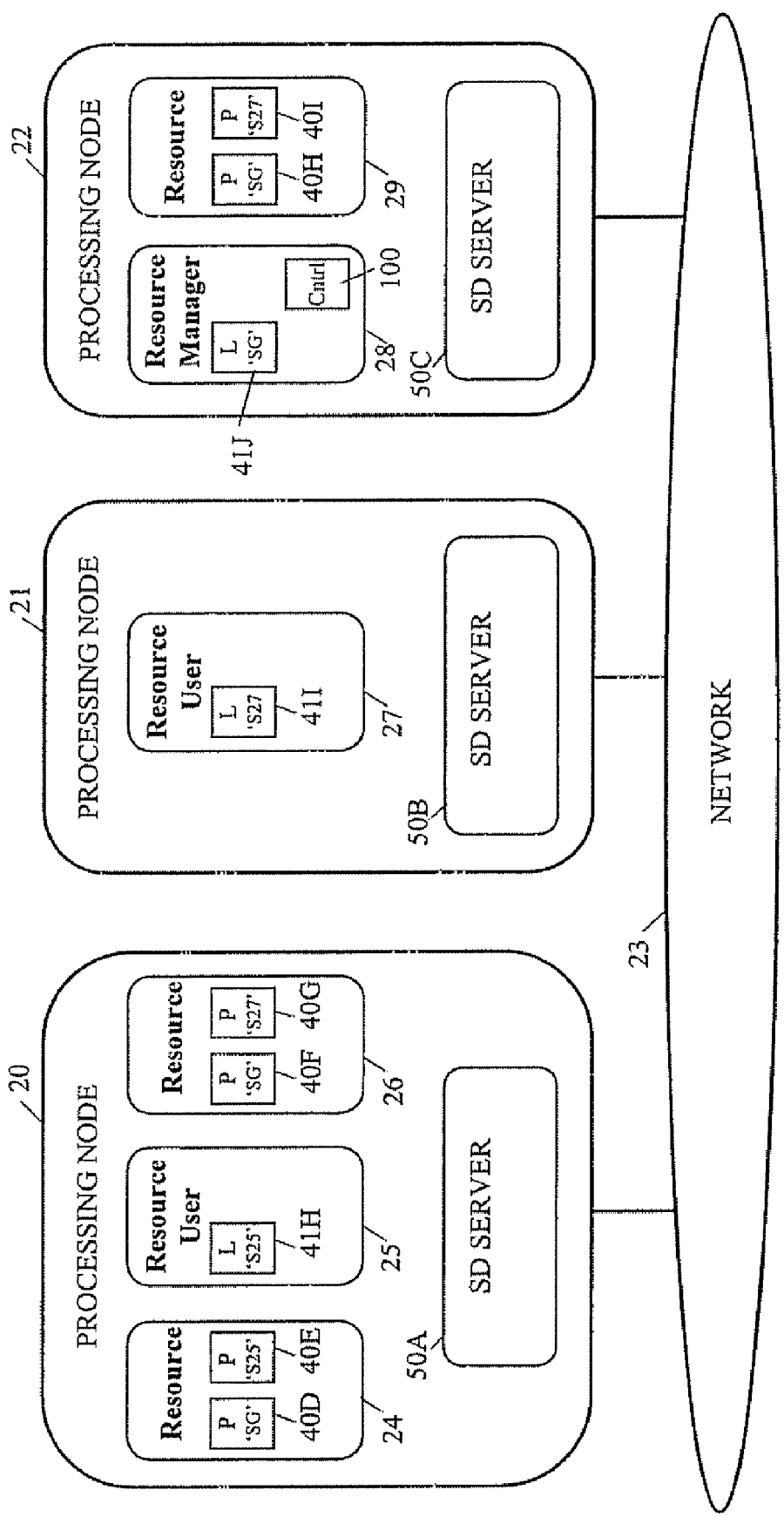
FIG. 7 is a diagram illustrating the use of the FIG. 2 system in disseminating resource allocation information.

FIG. 7 illustrates the use of the FIG. 2 system in disseminating resource allocation information. In particular, the entities 24, 26 and 29 are resources, the entities 25 and 27 are resource users, and the entity 28 is a resource manager. It should, however, be noted that the set of state providers 40 and listeners 41 registered by these entities in the FIG. 7 system is different to that of FIG. 2.

The resource manager 28 is made aware in any suitable manner of the resource needs of the current resource users 25, 27 in the system (for example, the resource users can be arranged to send resource requests to the resource manager directly). The resource manager 28 includes a resource controller 100 that decides which resources are to be allocated to which resource users and then notifies each resource of its allocation (for example, by means of a message sent point-to-point over the network 23). In the present case, the resource manager makes the following allocations:

resource 24 is allocated to resource user 25
resource 26 is allocated to resource user 27
resource 29 is allocated to resource user 27

Each resource 24, 26 and 29 always has registered a respective provider 40D, 40F, 40H in respect of the same state-information identifier "SG", each resource being arranged to provide under this identifier, allocation state information including the identity of the resource and its current allocation. In addition, each resource 24, 26 and 29 is arranged to register a further respective provider 40E, 40G, 40I upon the resource being allocated to a resource user, this further provider being registered in respect of a state-information identifier associated with the resource user to which the resource has been allocated. Thus, the provider 40E is registered in respect of an identifier S25 associated with the resource user 25, and the providers 40G and 40I are registered in respect of an identifier S27 associated with the resource user 27. The providers 40E, 40G and 40I are respectively arranged to provide the aforesaid allocation state information of the resource of which they form a part.

Each resource user 25 and 27 always has registered a respective state listener 41H, 41I in respect of a state-information indicator corresponding to the state-information identifier associated with the resource user. Thus the listener 41H is registered in respect of indicator S25, and listener is registered in respect of indicator S27.

The resource manager always has registered a state listener 41J in respect of a state-information indicator corresponding to the state-information identifier SG.

As a result of this configuration of providers and listeners, any change in the allocation of a resource will result in the allocation state information of that resource being sent from the resource's provider associated with the identifier SG to the corresponding listener of the state manager; the latter is therefore always kept aware of the current allocation of the resources even if it was not responsible for that allocation. Furthermore, each resource user will be passed any allocation information concerning a change of allocation in a resource allocated to it (thus, upon allocation of a resource to a resource user, the resource user is notified of this as soon as the resource has registered the appropriate provider; conversely, when a resource is removed from a resource user, the resource user is first notified before the involved provider of the resource concerned is de-registered by the latter).

In the foregoing example the state manager was arranged to receive allocation state information by registering a single listener in respect of a generic indicator corresponding to a generic identifier SG used by all resources. As already mentioned the correspondence between indicator and identifier can be based on matching portions only of each rather than requiring a full match. Furthermore, generic identifiers and corresponding indicators can be used in respect of sub-groups of resources such as resources of a particular type; in this manner one resource manager can be made responsible for resources of one type and another resource manager responsible for resources of a different type, each resource type being identified by a respective type-generic state-information identifier for which the corresponding manager registers a corresponding indicator.

The resource users and managers observe the following consistency properties depending on the form of the state-dissemination arrangement used:

If the basic state-dissemination arrangement is used, a resource user or manager can only assume that it can discover resources and resource allocations that have existed. If a resource manager changes a resource allocation and it observes the change, it cannot assume that any other resource manager or resource user will ever observe the change.

If the TSD arrangement is used, a resource user or manager can assume that any resources and resource allocations it observes are correct to within the aforesaid predetermined time limit. A resource manager can assume that any resource allocation it observes is either observed, or its absence is observed, by all other resource managers and users within the predetermined time limit. This level of consistency allows a resource manager to know allocations do not conflict. For example, a resource manager can withdraw a resource from one resource user and then after a delay equal to the predetermined time limit allocate it to another resource user, knowing that the resource users will not believe they both own the resource at the same time.

If a TPSD arrangement is used, a resource user or manager can assume that: any resource and resource allocation it observes is also observed by all other interested resource users and managers in its partition within the predetermined time limit (though the resource user or manager can only rely on this after twice the time limit); and is not observed by any resource user or manager outside its partition. This level of consistency allows resource managers to take coordinated actions without requiring additional direct communication. For example, assume that there is a resource requirement for a database server that must be in the same partition as a web server. If a network failure results in the database and web server resources being in different partitions, then a resource manager local to the database server will observe the change and withdraw the database server resource (possibly terminating the database) and a resource manager local to the web server can calculate a time by which it can safely allocate a resource for a new database. The result is that two resource managers that cannot communication can guarantee that no two resources are allocated for the database server role at the same time.

As will be apparent from the state-dissemination arrangements described above, the allocation status of a resource is maintained by the resource itself rather than in some external entity such as the state-dissemination arrangement. A small efficiency improvement may, however, be obtained if an SD server caches the last state information it receives from each local provider 40 as this enables it to respond, without consulting the provider concerned, to a request for the state information for provision to a newly registered listener interested in that information.

It will be appreciated that many variants are possible to the above described embodiments of the invention. For example, the implementations of the state-dissemination arrangement described with reference to FIGS. 2 to 7 are by way of example and other implementations are possible, particularly with respect to how the interest of an entity in particular state information is associated with the source(s) of such information.

In certain cases, a resource manager is not required. For example, each resource in a system can be pre-allocated to a specific resource user, each resource storing this allocation so that as soon as the resource becomes available to the system, it can register a suitable state provider with the state-dissemination service to make its allocation to a particular resource user known to the system without having to wait to be allocated to a resource by a resource manager. It is also possible to arrange for a resource to be its own manager allocating itself to resource users as it sees fit (which can include an initial allocation to a predetermined user).

It may also be noted that even where a resource is being managed by a separate resource manager, it does not necessarily always have to accept the allocation instructions received from the manager. Advantageously, the resource can apply a predetermined set of rules to filter the allocation instructions it receives. For example, the resource may refuse to accept an allocation instruction because it has an overriding rule never to accept allocation to the specified resource user; or because it has simultaneously received a conflicting allocation instruction from another resource manager which, according to another rule, has higher priority; or because it is already at the limit of the number of resources to which it can be simultaneously allocated according to a further rule.

Whilst resources are preferably arranged to provide their allocation state information to the state-dissemination service whenever this state information changes, the allocation state information can additionally or alternatively be provided to the state-dissemination service in other circumstances, such as at regular time intervals.

Resource users can also be arranged to take allocation decisions—for example, resource users can be given authority to transfer resources allocated to them to other resource users. This is akin to the resource user that is allocated a resource effectively having an ownership right in the resource including the right of disposition. Such a right of disposition can be exercised directly by the resource user or through an existing resource manager.

Resource users can also be arranged to carry out role allocation between the resources allocated to them. Thus, rather than a resource user asking a resource manager for one database server and four application servers, it can simply ask for five generic servers and then subsequently allocate the roles of database server and application server between the generic servers it is allocated by the resource manager.

It may also be noted that where resource managers learn of the needs of the resource users by resource requests sent by the users to the managers, a resource user is preferably arranged to repeat a resource request periodically until it observes, via the state-dissemination service, that it has been allocated the requested resource. This builds resilience into the system and enables resource managers to drop resource requests if necessary.

Each resource user can be provided with a respective associated resource manager (indeed, a resource user and a manager can be combined in a single entity). In this case, the resource user and associated manager effectively form a combination equivalent to the resource user acting as its own resource manager.

It will be appreciated that the SD servers, the resources, resource users and resource managers described above will typically be implemented using appropriately programmed general purpose program-controlled processors and related hardware devices (such as storage devices and communication devices). However, other implementations are possible.

The invention claimed is:

1. A system comprising: a plurality of resource devices implemented in at least one processing node, each resource device arranged to maintain and provide state information about its allocation to one or more resource users, wherein the one or more resource users comprise one or more application programs; a state-dissemination arrangement for disseminating the state information provided by the resource devices; and at least one receiving entity arranged to receive state information from the state-dissemination arrangement, the receiving entity comprising at least one resource user arranged to use the state information it receives to ascertain which of the resource devices, if any, have been allocated to it, wherein each receiving entity with an interest in respective particular state information is configured to register with the state-dissemination arrangement to indicate its interest in that information, wherein the state-dissemination arrangement is configured to use these registered interests to manage dissemination of the state information.

2. A system according to claim 1, wherein each receiving entity is configured to register a state-information indicator indicative of desired state information to be received, wherein each resource device is arranged to provide state information identified by a state-information identifier, wherein the state-dissemination arrangement is configured to match the state information identifiers with the registered state-information indicators to manage the dissemination of state information according to the registered interests.

3. A system according to claim 2, wherein each resource device is configured to register with the state-dissemination arrangement a resource state-information identifier for state information to be provided by the resource device, wherein the state dissemination arrangement is configured to match registered resource state-information identifiers with registered state-information indicators and to store association data associating each registered resource state-information identifier with data for managing the dissemination of the state information identified by that identifier, the state dissemination arrangement being arranged to use the association data in disseminating the state information.

4. A system according to claim 3, wherein the state-dissemination arrangement comprises multiple state-dissemination servers configured to communicate with each other, wherein each resource device and each receiving entity is operatively associated with a respective state-dissemination server, wherein the association data associates each registered state-information identifier with each state-dissemination server operatively associated with any receiving entity that has registered a state-information indicator matching the identifier, wherein each state-dissemination server is configured to use the association data to disseminate the state information it receives from a resource device to each server indicated by the association data as being associated with the identifier with the latter server being arranged to pass on the state information to each receiving entity operatively associated with it that has registered a state-information indicator matching the identifier of the state information concerned.

5. A system according to claim 4, comprising processing nodes interconnected by a communications network, wherein the resource devices and the at least one receiving entity are distributed between the processing nodes as part of the communications network, wherein each processing node is associated with a respective state-dissemination server with the servers being arranged to communicate with each other over the communications network.

6. A system according to claim 4, wherein each state-dissemination server is configured to store, for each resource device and receiving entity with which it is operatively associated, registration data indicative of any state-information identifiers and indicators registered by the resource device or receiving entity concerned.

7. A system according to claim 4, wherein the state-dissemination server is configured to store the association data in respect of the state-information identifiers registered by any resource devices operatively associated with the server of which the component forms a part.

8. A system according to claim 4, wherein each state-dissemination server is configured to store source data to indicate, for the state-information indicators registered by any receiving entity operatively associated with the server, which one or more of the multiple state-dissemination servers corresponding identifiers have been registered.

9. A system according to claim 4, wherein each state-dissemination server comprises a respective state manager, the state manager of each state-dissemination server comprising a local registry which in turn comprises: a local register arranged to store the association data related to the server, registration data indicative, for each resource device and state-information observer operatively associated with the server, of any state-information identifiers, and indicators registered by the resource device or receiving entity concerned; a first updater configured to register a state-information identifier for a resource device operatively associated with the server by updating the registration data in the local register accordingly; and a second updater configured to register a state-information indicator for a receiving entity operatively associated with the server by updating the registration data accordingly.

10. A system according to claim 9, wherein the state-dissemination server further comprises a global registry, wherein the first updater of each local registry when registering a new state-information identifier is configured to send a first message including that identifier to the global registry, wherein the second updater of each local registry when registering a new state-information indicator is configured to send a second message including that indicator to the global registry, the global registry comprising: a global register configured to store, for each state-information identifier and indicator, data indicative of each state-dissemination server where that identifier or indicator has been registered; a first global updater configured to receive the first message and to update the global register regarding the identifier in the first message, find any matching state-information indicator in the global register, and return to the server that sent the message association-update data indicative of the or each state-dissemination server where a matching indicator was registered; and a second global updater configured to receive the second message and to update the global register regarding the indicator in the second message, find any matching state-information identifier in the global register, and send to the state-dissemination server where that identifier was registered association-update data indicative of the state-dissemination server that sent the second message, wherein each local registry further comprises a third updater configured to update the association data held by the local register in response to receipt of the association-update data from the global registry.

11. A system according to claim 2, wherein each resource device is configured to register a state-information identifier comprising at least a generic portion the same for all resource devices, wherein the state-dissemination server is configured to detect a match between all identifiers and a state-information indicator comprising the generic portion whereby any of the receiving entities can register a single state-information indicator to receive state information from all resource devices.

12. A system according to claim 2, wherein each resource device of a given type is configured to register a state-information identifier comprising at least a type-generic portion the same for all resource devices of the given type, wherein the state-dissemination server is configured to detect a match between all these identifiers and a state-information indicator comprising this type-generic portion whereby any of the receiving entities can register a single state-information indicator to receive state information from all resource devices of the given type.

13. A system according to claim 2, wherein each resource device allocated to a particular resource user is configured to register a state-information identifier comprising at least a user-specific portion the same for all the resource devices, wherein the state-dissemination server is configured to detect a match between the identifiers and a state-information indicator comprising the user-specific portion whereby the resource user concerned can register a single state-information indicator to receive state information from all resource devices allocated to it.

14. A system according to claim 2, wherein the state-dissemination server is configured to detect a match between a state-information identifier and a state-information indicator only in the event of a complete match over the full extent of both.

15. A system according to claim 2, wherein the state-dissemination server is configured to detect a match between a state-information identifier and a state-information indicator upon at least a part of the identifier matching at least a part of the identifier.

16. A system according to claim 2, wherein at least one of the receiving entities is arranged to register multiple different state-information indicators.

17. A system according to claim 2, wherein at least one resource device is arranged to register multiple state-information identifiers identifying the same state information.

18. A system according to claim 2, wherein at least one resource device is arranged to register a further state-information identifier identifying additional state information not including the allocation of the resource device, wherein at least one of the receiving entities is arranged to register a further state-information indicator corresponding to the further state-information identifier whereby to receive the additional state information.

19. A system according to claim 8, wherein each state-dissemination server comprises a communication timer configured to monitor whether the server can still communicate within a communication time limit with other state-dissemination servers and, upon this limit not being met in respect of any such other server, to use the source data of the server of which it forms a part to inform any operatively-associated ones of the receiving entities that had registered to receive state information coming from a resource device associated with the server with which communication is out of time, that this state information is no longer available.

20. A system according to claim 19, wherein each state-dissemination server further includes partition manager for identifying, in cooperation with partition managers of other servers, a collection of servers, including itself, between all of which state information can be disseminated within the predetermined time limit as monitored by the communication timer of the servers, wherein each state-dissemination server only belongs to one collection, wherein the state-dissemination arrangement is configured to provide the receiving entities of a collection with state information only from resource devices within the same collection, wherein each state-dissemination server of a collection is configured to inform its operatively associated receiving entities of any disruption to collection membership whereby a given one of the receiving entities of the collection determines that it cannot rely upon the receipt by interested other receiving entities of the collection of any item of state information which the given one of the receiving entities itself has received within an immediately preceding time period of duration corresponding to twice the predetermined time limit.

* * * * *

UNITED STATES PATENT AND TRADEMARK OFFICE
CERTIFICATE OF CORRECTION

PATENT NO. : 8,166,171 B2  
APPLICATION NO. : 13/045216  
DATED : April 24, 2012  
INVENTOR(S) : Paul Murray et al.

Page 1 of 1

It is certified that error appears in the above-identified patent and that said Letters Patent is hereby corrected as shown below:

On the title page, item (75), Inventors, in column 1, line 2, delete "Ceasr" and insert -- Cesar --, therefor.

Signed and Sealed this  
Twenty-seventh Day of November, 2012

David J. Kappos  
*Director of the United States Patent and Trademark Office*